July 12, 1938.  J. F. COX  2,123,843

METHOD OF MAKING THREADED NUTS

Filed Feb. 16, 1937  4 Sheets-Sheet 1

Inventor:
Joseph F. Cox.
by Walter S. Jones
Att'y.

July 12, 1938. J. F. COX 2,123,843
METHOD OF MAKING THREADED NUTS
Filed Feb. 16, 1937 4 Sheets-Sheet 2

Inventor:
Joseph F. Cox.
by Walter P. Jones
Att'y.

July 12, 1938.    J. F. COX    2,123,843
METHOD OF MAKING THREADED NUTS
Filed Feb. 16, 1937    4 Sheets-Sheet 3
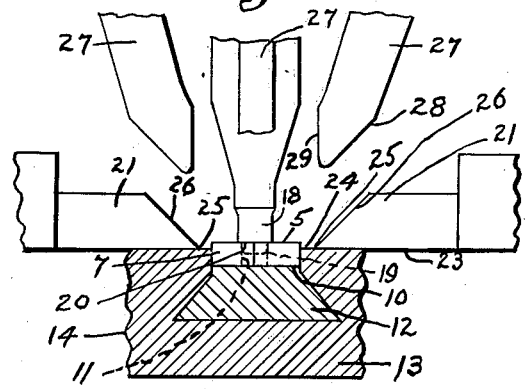
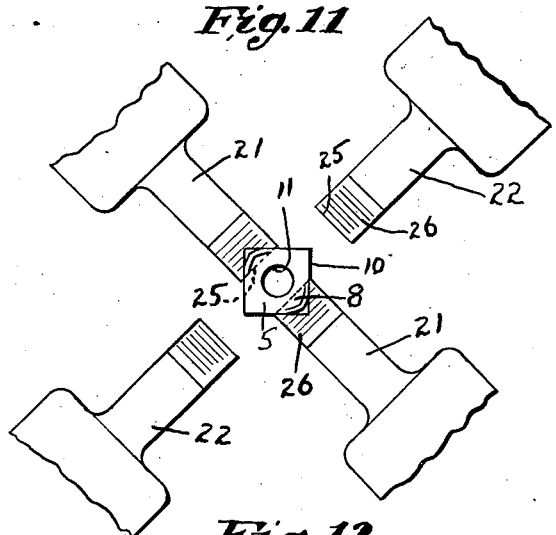
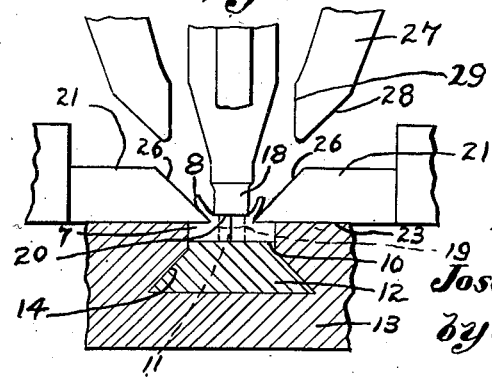
Inventor:
Joseph F. Cox.

July 12, 1938.  J. F. COX  2,123,843
METHOD OF MAKING THREADED NUTS
Filed Feb. 16, 1937  4 Sheets-Sheet 4
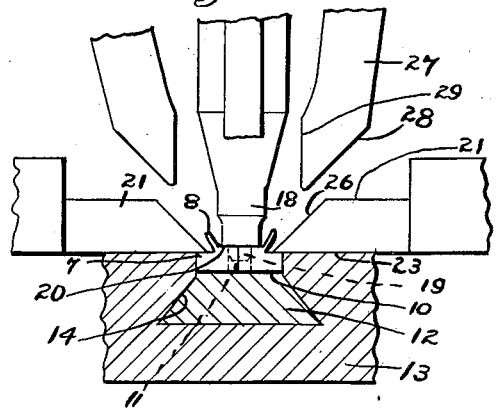
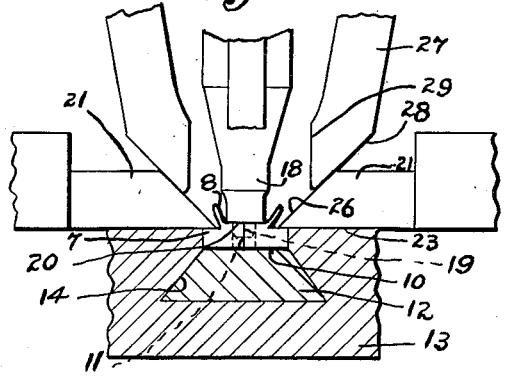
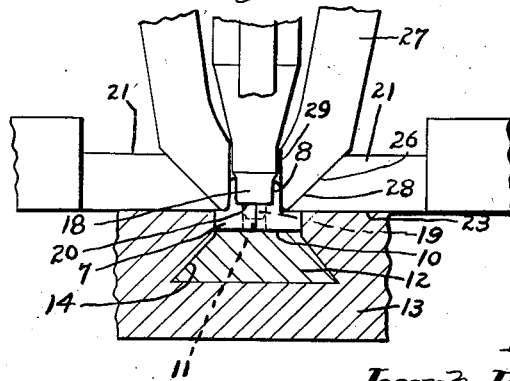
Inventor:
Joseph F. Cox.
by Walter S. Jones
Att'y.

Patented July 12, 1938

2,123,843

UNITED STATES PATENT OFFICE 2,123,843

METHOD OF MAKING THREADED NUTS

Joseph F. Cox, Arlington, Mass., assignor to United-Carr Fastener Corporation, Cambridge, Mass., a corporation of Massachusetts.

Application February 16, 1937, Serial No. 126,002

10 Claims. (Cl. 10—86)

This invention relates to screw-threaded nuts and the method of making the same and particularly to nuts adapted to be initially clamped to a support before receiving a bolt.

An object of my invention is to provide a nut device of simple construction having structural features enabling it to be quickly and easily secured to a support.

Another object of my invention is to provide a simple and economical method for forming a nut device having integral projections extending from one end of a nut blank, the projections being sheared from a nut blank in such a way that they may extend through an aperture of a support and be clamped into engagement with an opposite face of a support from the nut blank so as to secure the nut device to the support.

Other objects will be apparent from an inspection of the specification hereinafter set forth and the accompanying drawings.

Reference is hereby made to my divisional application Serial No. 174,790, filed November 16, 1937.

Referring to the drawings, in which I have illustrated a preferred embodiment of my invention:

Fig. 10 is a section taken along the line 10—10 of Fig. 7, the nut blank being shown in elevation, and the figure also including portions of a mandrel and straightener jaws in elevation;

Fig. 11 is a top view showing the first step of the process or method of shearing the nut blank to form the projecting portions, the die and die slide being omitted for clarity of illustration;

Fig. 12 is a vertical section similar to Fig. 10 showing the first step in the shearing operation; and Figs. 13, 14 and 15 are vertical sections similar to that of Fig. 10 with parts shown in elevation for carrying forward the remaining steps of my process or method.

Figure 1:
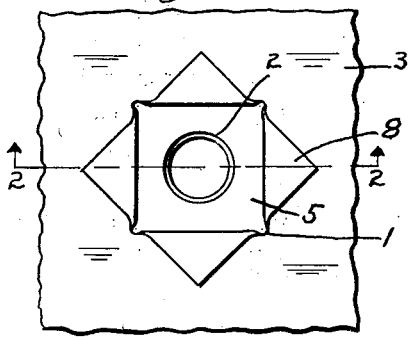
Figure 1 is a plan view of my improved nut device as it appears when secured to a support.
Figure 2:
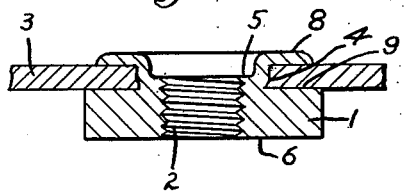
Fig. 2 is a section taken along the line 2—2 of Fig. 1.
Figure 3:
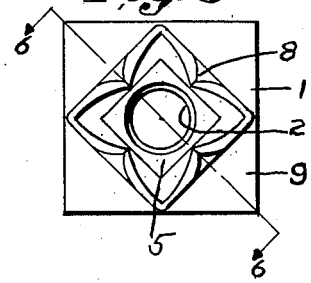
Fig. 3 is a plan view of my nut device per se.
Figure 4:
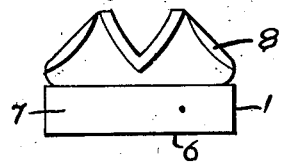
Fig. 4 is a side corner view of the device shown in Fig. 3.
Figure 5:
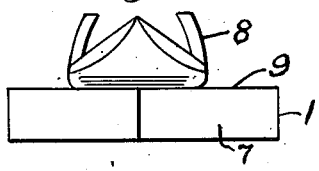
Fig. 5 is a view similar to that of Fig. 4, but with the nut turned 45°.
Figure 6:
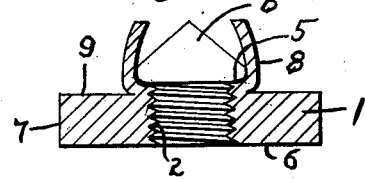
Fig. 6 is a section taken along the line 6—6 of Fig. 3.

Referring first to the nut device selected for illustration of my invention, I have shown in Figs. 1 and 2 a nut body 1 having a bolt-receiving aperture 2. The nut body is secured to a support 3 preparatory to receiving a bolt (not shown) by means of a number of projecting portions which extend from a support-engaging end face of the nut body through an aperture 4 of the support 3. The projecting portions engage the material of the top surface of the support adjacent the aperture 4 so that when the nut device is securely attached to the support, portions of the support are disposed between the end face of the nut body and the projecting portions.

My preferred nut device, as illustrated in Figs. 1–6 of the drawings, comprises a nut body 1 of square shape having opposed ends 5 and 6 (Figs. 2 and 6) and a peripheral wall 7 between the ends. Four triangular-shaped projecting portions 8 formed integral with an end face 9 of the nut body extend upwardly in substantially perpendicular relation to the face 9. The projecting portions 8 are formed by cutting through the corners of the nut body 1 for a predetermined distance from a position outside the peripheral wall 7 so as to shear the projecting portions from the nut body. The wall 7 is cut at points spaced from the margin of the wall and the end 5 of the blank of my nut device a distance equal to the thickness of the projecting portions. The projecting portions so formed are then forced upwardly to a substantially upright position relative to the end face, as most clearly shown in Figs. 5 and 6. As a result of this method whereby the projecting portions are formed by shearing the blank through the corners the projections have a substantially triangular shape and the line of the outer surface of each is disposed at an angle of substantially 45° relative to adjoining sides of the square body 1. In my preferred form the lateral edges of each of the projecting portions 8 near its base are integral with respective lateral edges of the next immediate projecting portions, but I do not wish to be limited by this specific construction, as it may be advantageous to provide a nut device having projecting portions which project from the end face entirely independently of each other.

It will be noticed that the end face 9 has a flat area from the outer margin of the face to the points of junction of the projecting portions 8 with the face. This described flat construction is advantageous as it enables the end face 9 to lie flush with a flat surface of the support 3, as shown in Fig. 2.

In attaching my nut device to a support, such as illustrated in Figs. 1 and 2, the nut device is moved into attaching position with the end face 9 of the nut body flush with the lower surface of the support and the projecting portions 8 extending through the aperture 4 of the support. The projecting portions are then struck down by a suitable tool (not shown) so as to be clamped into engagement with an opposite surface of the support from that engaged by the end face 9 (Fig. 2).

Referring now to my preferred process of manufacture as illustrated in Figs. 7–15, I have chosen a square nut blank having four projecting portions for purposes of illustrating my invention. I do not, however, wish to limit my method of manufacture by the exact mechanism for carrying out the process of making the particular article shown because it will be apparent from the drawings and specification that I may shear one or more projecting portions from nut blanks of other sizes and shapes by modifying slightly the shearing mechanism hereinafter set forth. Furthermore, I have shown only enough mechanism to illustrate, to anyone skilled in the art, just how my improved nut may be made.

Figure 8:
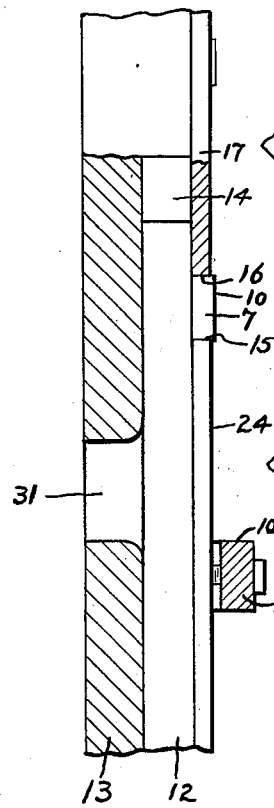
Fig. 8 is a section taken along the line 8—8 of Fig. 7, the sliding die being shown in elevation.
Figure 7:
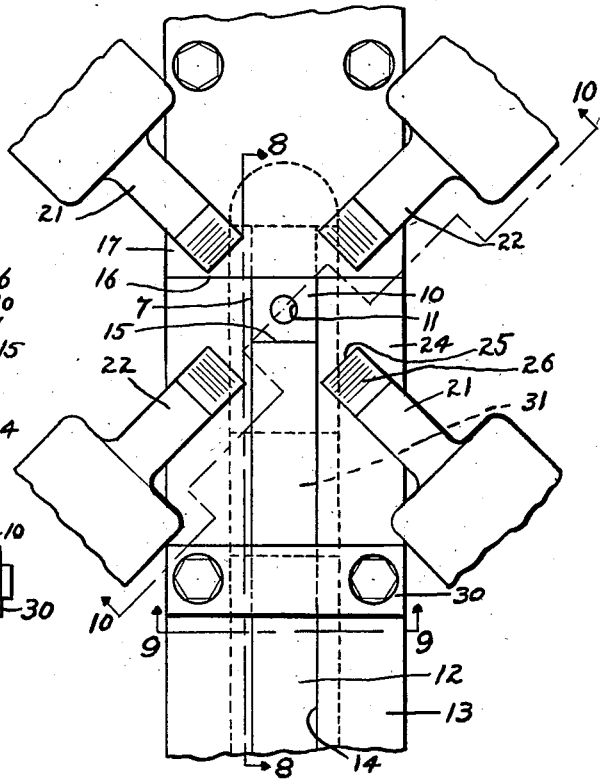
Fig. 7 is a top plan showing a nut blank in position to be acted upon by shearing tools and other portions of a device for making the nut device.
Figure 9:
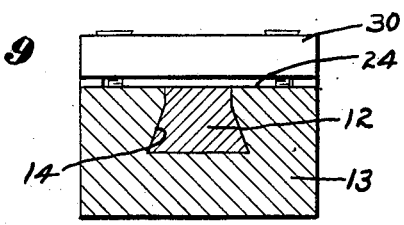
Fig. 9 is a section taken along the line 9—9 of Fig. 7.

Referring to Fig. 7 of the drawings, I have shown a square nut blank 10 which is preferably provided with an opening 11 before the shearing operation but the opening need not be threaded until the nut device is in every other respect completed. The blank 10 is supported by a die 12 slidably mounted relative to a die 13 which has a channel 14 receiving the sliding die 12. The face of the sliding die 12 upon which the nut blank rests has been cut away from the main body of the die providing a substantially perpendicular face 15 (Fig. 8). When the nut blank is in proper position for the shearing operation, one of its sides is supported by the face 15, while its other three sides are supported by opposed side walls of the die 13 adjacent the channel 14 and an edge 16 of a cover plate 17, as shown in Figs. 7 and 8. As an additional means for supporting the nut blank during the shearing operation, I have preferably provided a mandrel 18 (Fig. 10) having a free end portion 19 of reduced diameter providing a shoulder 20. The shoulder 20 engages the end 5 of the blank 10 and the end portion or pilot 19 enters the opening 11 of the blank 10, as illustrated in Fig. 10. The mandrel 18 serves also to prevent the material of the blank from crowding into the opening 11 during formation of the projecting portions. It will be noticed that when the nut is seated in position for the shearing operation, a portion of the material of the nut adjacent one end which is substantially equal to the thickness of the projecting attaching portions 8 extends beyond the upper surface of the die 13 (Figs. 8 and 10) where it is exposed to action of the shearing tools.

The projecting portions 8 are sheared from the blank 10 by means of two pairs of laterally-movable tools 21—21 and 22—22 disposed outside the peripheral wall 7 of the blank 10. The tools of each of said pairs are disposed in opposite relation in my preferred form and each tool faces a corner of the blank 10, as most clearly shown in Figs. 7 and 11. Each of the shearing tools 21 and 22 has an under surface 23 in constant contact with the top surface 24 of the die 13 (Fig. 10) so as to ride on the surface 24 during lateral movement of the tools. A cutting edge 25 is provided at an end of the surface 23 and an open face 26 of the tool adjacent the edge 25 is inclined at an angle of substantially 45° relative to the surface 23.

Referring to a preferred succession of steps by which manufacture of my nut device is carried out, the sliding die 12 is retracted from the full forward position shown in Figs. 7 and 8 and a nut blank is placed upon the relieved part of the die by any suitable feed mechanism (not shown). The sliding die is then moved forward so as to seat the nut blank in position to be sheared by the tools 21 and 22. After the nut blank has been moved into the last-mentioned position, the mandrel 18 comes down and the pilot 19 enters the opening 11 of the nut blank and its shoulder 20 engages the end 5 of the nut blank, as most clearly shown in Fig. 10.

In the first step of the shearing operation (Figs. 11 and 12) the pair of opposed tools 21—21 move inwardly so as to cut laterally through the wall 7 of the blank. As a result of this operation a pair of opposed projecting portions 8 are sheared from the nut blank, the projecting portions extending from the blank at an angle relative to the lateral plane of the blank which is substantially equal to the angle of an inclined face 26 of the tool relative to the under surface 23, as most clearly shown in Fig. 12. In the next step, illustrated in Fig. 13, the tools 21—21 recede slightly from full forward position and dwell in the receded position. The other pair of opposed tools 22—22 now move laterally inwardly to shear another pair of opposed projecting portions from the nut blank in the same manner described in connection with operation of the first pair of tools 21—21. The tools 22—22 recede slightly from full forward position and dwell in the receded position in the same way as the tools 21—21.

In the next step, illustrated by Figs. 14 and 15, the projecting portions 8 are moved to a substantially upright position relative to the lateral plane of the blank. This act is carried out by means of four straightener jaws 27, each of which is disposed in normal resting position substantially above one of the shearing tools and in full outward position. The jaws are pivotally assembled with a supporting part (not shown) in such a way that they have freedom of movement for carrying out the straightening action hereinafter described. Each of the jaws has a cam surface 28 and a straightening surface 29. The straightening action is accomplished by moving the jaws downwardly whereupon each of the cam surfaces 28 engages an inclined face 26 of a respective shearing tool (Fig. 14) and slides down the face 26. During the sliding action the respective straightening surface 29 engages the outer broad surface of a projecting portion 8 moving the projection into substantially upright position, as shown in Fig. 15.

After the projecting portions have been sheared out of the blank and straightened by the method hereinabove described, the mandrel and straightening jaws recede to normal resting position and the nut is removed from the sliding die 12 in any suitable manner. In my preferred form the aforesaid removal of the nut is accomplished by means of a bridge 30 (Figs. 7–9) disposed above the die 13 at a predetermined heighth relative to the die, so that the nut blank passes beneath the bridge during forward movement of the die slide 12 but is knocked off the slide into a carry-off opening 31 (Figs. 7 and 8) during return movement of the die slide by reason of engagement of the projecting portions 8 with the bridge.

It will thus be seen that my improved process for making a nut device by shearing the attaching portions from a nut blank is simple and economical, and for that reason particularly advantageous for manufacturing nuts in large quantities.

With reference to my preferred form of invention illustrated and described, I am aware that changes and alterations may be made in the nut device per se and that the succession of steps for making the device may be changed or modified without departing from the spirit of my invention. For that reason I do not wish to be limited by the preferred form of my invention and method of making the same, as illustrated and described, since the scope of my invention is best set forth in the following claims.

What is claimed is:

1. The method of forming a nut device of a type having a body with an end face and attaching means integral with an end face of said body which comprises cutting laterally into said body from its outer edge just below the surface of one end to shear the metal for said attaching means from said nut blank and forming the sheared portion into suitably shaped attaching means.

2. The method of forming a nut device of a type having a body with an end face and a number of projecting portions integral with said end face which comprises taking a nut blank having opposed ends and a peripheral wall between said ends, cutting into said peripheral wall at specified points around the same to shear said projecting portions from said blank and finally forcing said projecting portions to a substantially upright position relative to said end face.

3. The method of forming a nut device of a type having a body with an end face and a number of projecting portions integral with said end face which comprises taking a nut blank having opposed ends and a peripheral wall between said ends, shearing laterally into said wall at points spaced a distance from a margin of said wall adjacent one of said ends equal to the thickness of said projecting portions whereby said projecting portions are sheared from said blank and finally forcing said projecting portions to a substantially upright position relative to the plane surface of the end of said blank with which they are integral.

4. The method of forming a nut device of a type having a body with an end face and a number of projecting portions integral with said end face which comprises taking a nut blank of polygonal shape having opposed ends and a peripheral wall between said ends, cutting through the peripheral wall at at least two corners of said blank from points outside said wall for shearing said projecting portions from said blank and finally forcing said projecting portions to a substantially upright position relative to the plane surface of the end of said blank with which they are integral.

5. The method of forming a nut device of a type having a body with an end face and a number of projecting portions integral with said end face which comprises taking a nut blank having opposed ends and a peripheral wall between said ends, fixing said nut blank in proper position for operation thereon by at least two laterally movable shearing tools, moving said tools to cut into the peripheral wall of said blank for shearing said projecting portions from said blank and finally forcing said projecting portions to a substantially upright position relative to the horizontal plane of said blank.

6. The method of forming a nut device of a type having a body with an end face and a number of projecting portions integral with said end face which comprises taking a nut blank having opposed ends and a peripheral wall between said ends, fixing said nut blank in proper position for operation thereon by at least two laterally movable shearing tools, each of said shearing tools having a cutting edge and an inclined face extending from said edge, moving the cutting edges of said tools into the peripheral wall of said blank for shearing said projecting portions from said blank and finally forcing each of said projecting portions to a substantially upright position relative to the horizontal plane of said blank by bringing a straightening tool down upon the inclined face of each of said shearing tools, said tool being cammed by said inclined face against a projecting portion for straightening said portion.

7. The method of forming a nut device of a type having a body with an end face and four projecting portions integral with said end face, which comprises taking a nut blank having opposed ends and a peripheral wall between said ends, fixing said nut blank in proper position for operation thereon by four laterally movable shearing tools positioned outside the peripheral wall of said blank, each of said shearing tools having a cutting edge and an inclined face extending from said edge, moving the cutting edge of each of said tools into the peripheral wall of said blank for shearing said projecting portions from said blank and finally forcing each of said projecting portions upwardly to a substantially upright position relative to the horizontal plane of said blank by bringing a straightening jaw down upon the inclined face of each of said shearing tools, said jaw being cammed by said inclined face against a projecting portion for forcing said portion upwardly.

8. The method of forming a nut device of a type having a body with an end face and a pair of oppositely disposed projecting portions integral with said end face, which comprises taking a nut blank having opposed ends and a peripheral wall between said ends, fixing said nut blank in proper position for operation thereon by a pair of laterally movable shearing tools positioned outside said blank in diametrical relation one to another, each of said shearing tools having a cutting edge and an inclined face extending from said edge, moving the cutting edge of each of said tools into the peripheral wall of said blank for shearing said projecting portions from said blank, withdrawing said tools slightly from full forward position, said tools dwelling in said withdrawn position, and finally forcing each of said projecting portions upwardly relative to said blank by bringing a straightening jaw down upon the inclined face of each of said shearing tools, said jaw being cammed by said inclined face against a projecting portion for forcing said portion upwardly.

9. The method of forming a nut device of a type having a tapped body with an end face and two pairs of oppositely disposed projecting portions integral with said end face, which comprises taking a polygonal nut blank having opposed ends and a peripheral wall between said ends, fixing said nut blank in proper position for operation thereon by two pairs of laterally movable shearing tools, each of said tools having a cutting edge and an inclined face extending from said edge, the tools of each of said pairs arranged in diametrical relation outside the peripheral wall of said blank and opposite a corner thereof, moving the cutting edges of one pair of opposed tools into the peripheral wall of said blank at said corners for shearing a pair of said projecting portions from said blank, withdrawing said tools slightly from full forward position, moving the cutting edges of said other pair of opposed tools into the peripheral wall of said blank at respective corners thereof for shearing the other pair of said projecting portions from said blank, withdrawing said last-mentioned tools slightly from full forward position, said tools dwelling in said withdrawn position, and finally forcing each of said projecting portions upwardly to a substantially upright position relative to the horizontal plane of said blank by bringing a straightening jaw down upon the inclined face of each of said shearing tools, said jaw being cammed by said inclined face against the projecting portion for forcing said portion upwardly.

10. The method of forming a nut device of the type having a body with an end face and attaching means integral with the end face of said body which comprises moving a tool laterally into said body from its outer edge below the surface of one end thereof to displace the metal from said end inwardly and upwardly to form said attaching means.

JOSEPH F. COX.